United States Patent
Apfel

(10) Patent No.: US 8,181,327 B2
(45) Date of Patent: May 22, 2012

(54) MECHANICAL METHOD FOR IMPROVING BOND JOINT STRENGTH

(75) Inventor: Jeffrey R. Apfel, Shelby Township, MI (US)

(73) Assignee: Zephyros, Inc, Romeo, MI (US)

( * ) Notice: Subject to any disclaimer, the term of this patent is extended or adjusted under 35 U.S.C. 154(b) by 389 days.

(21) Appl. No.: 12/367,152

(22) Filed: Feb. 6, 2009

(65) Prior Publication Data

US 2009/0202294 A1   Aug. 13, 2009

Related U.S. Application Data

(60) Provisional application No. 61/027,688, filed on Feb. 11, 2008, provisional application No. 61/027,294, filed on Feb. 8, 2008.

(51) Int. Cl.
*B23P 25/00* (2006.01)
*F16B 11/00* (2006.01)
*B32B 7/08* (2006.01)

(52) U.S. Cl. .............. 29/458; 403/267; 156/92

(58) Field of Classification Search .............. 29/525.13, 29/525.11, 525.01, 458, 428; 403/267; 156/92
See application file for complete search history.

(56) References Cited

U.S. PATENT DOCUMENTS

| | | |
|---|---|---|
| 2,997,122 A | 8/1961 | Frey et al. |
| 3,124,626 A | 3/1964 | Graham et al. |
| 3,451,696 A | 6/1969 | Gustav et al. |
| 3,586,556 A | 6/1971 | Clark et al. |
| 4,319,768 A | 3/1982 | Youngdale |
| 4,332,397 A | 6/1982 | Steger |
| 4,810,548 A | 3/1989 | Ligon et al. |
| 4,922,596 A | 5/1990 | Wycech |
| 4,978,562 A | 12/1990 | Wycech |
| 4,981,287 A | 1/1991 | Cothenet |
| 5,124,186 A | 6/1992 | Wycech |
| 5,266,133 A | 11/1993 | Hanley et al. |
| 5,344,208 A | 9/1994 | Bien et al. |
| 5,358,397 A | 10/1994 | Ligon et al. |
| 5,431,363 A | 7/1995 | Ezzat et al. |
| 5,487,803 A | 1/1996 | Sweeney et al. |
| 5,506,025 A | 4/1996 | Otto et al. |
| 5,552,095 A | 9/1996 | Merser et al. |

(Continued)

FOREIGN PATENT DOCUMENTS

EP    0893332 A1    1/1999

(Continued)

OTHER PUBLICATIONS

International Search Report, Dated Sep. 23, 2010, Application No. PCT/US2010/035122.

(Continued)

*Primary Examiner* — John C Hong
(74) *Attorney, Agent, or Firm* — Dobrusin & Thennisch PC

(57) ABSTRACT

A method for improving joint strength between a first and second member comprising the steps of: applying a sealant material including a matrix material at least partially encasing rigid components to the first and second members; joining the first and second members upon an application of force that is applied through the use of one or more fasteners; wherein a compressive force is applied to the exterior surface of both the first and second members by the one or more fasteners while the rigid components apply an internal tension force acting opposite of the compression force to the interior surface of both the first and second members proximate to the fastener to form a mechanical lock thereby reducing slippage and generally maintaining the joint in position.

20 Claims, 3 Drawing Sheets

U.S. PATENT DOCUMENTS

| | | | |
|---|---|---|---|
| 5,571,355 | A | 11/1996 | Kornylo |
| 5,575,526 | A | 11/1996 | Wycech |
| 5,743,979 | A | 4/1998 | Lorbiecki |
| 5,755,486 | A | 5/1998 | Wycech |
| 5,766,719 | A | 6/1998 | Rimkus |
| 5,884,960 | A | 3/1999 | Wycech |
| 5,904,024 | A | 5/1999 | Miwa |
| 5,932,680 | A | 8/1999 | Heider |
| 5,933,680 | A | 8/1999 | Nishimura |
| 5,997,786 | A | 12/1999 | Arthur et al. |
| 6,030,701 | A | 2/2000 | Johnson et al. |
| 6,074,506 | A | 6/2000 | Herring, Jr. et al. |
| 6,103,341 | A | 8/2000 | Barz et al. |
| 6,131,897 | A | 10/2000 | Barz et al. |
| 6,199,940 | B1 | 3/2001 | Hopton et al. |
| 6,247,287 | B1 | 6/2001 | Takabatake |
| 6,270,600 | B1 | 8/2001 | Wycech |
| 6,293,572 | B1 | 9/2001 | Robbins et al. |
| 6,368,438 | B1 | 4/2002 | Chang et al. |
| 6,379,762 | B1 | 4/2002 | Omichinski |
| 6,382,635 | B1 | 5/2002 | Fitzgerald |
| 6,422,575 | B1 | 7/2002 | Czaplicki |
| 6,467,834 | B1 | 10/2002 | Barz et al. |
| 6,468,613 | B1 | 10/2002 | Kitano et al. |
| 6,471,285 | B1 | 10/2002 | Czaplicki et al. |
| 6,482,486 | B1 | 11/2002 | Czaplicki et al. |
| 6,511,120 | B1 | 1/2003 | Mitts |
| 6,530,577 | B1 | 3/2003 | Busby et al. |
| 6,543,976 | B1 | 4/2003 | Malofsky |
| 6,585,202 | B2 | 7/2003 | Broccardo |
| 6,668,457 | B1 | 12/2003 | Czaplicki |
| 6,719,293 | B1 | 4/2004 | Coles et al. |
| 6,786,533 | B2 | 9/2004 | Bock et al. |
| 6,793,274 | B2 | 9/2004 | Riley et al. |
| 6,808,774 | B2 | 10/2004 | Autterson et al. |
| 6,855,652 | B2 | 2/2005 | Hable et al. |
| 6,890,021 | B2 | 5/2005 | Bock et al. |
| 6,923,499 | B2 | 8/2005 | Wieber et al. |
| 6,941,719 | B2 | 9/2005 | Busseuil et al. |
| 6,953,219 | B2 | 10/2005 | Lutz et al. |
| 6,969,551 | B2 | 11/2005 | Richardson et al. |
| 6,991,237 | B2 | 1/2006 | Kassa et al. |
| 7,022,400 | B2 | 4/2006 | Bolling |
| 7,077,460 | B2 | 7/2006 | Czaplicki et al. |
| 7,199,165 | B2 | 4/2007 | Kassa et al. |
| 7,249,215 | B2 | 7/2007 | Surico et al. |
| 7,255,388 | B2 | 8/2007 | Le Gall et al. |
| 7,290,828 | B2 | 11/2007 | Kosal et al. |
| 7,318,873 | B2 | 1/2008 | Czaplicki et al. |
| 7,428,774 | B2 | 9/2008 | Thomas et al. |
| 7,469,459 | B2 | 12/2008 | Kosal et al. |
| 7,484,946 | B2 | 2/2009 | Nitsche et al. |
| 7,494,179 | B2 | 2/2009 | Deachin et al. |
| 7,503,620 | B2 | 3/2009 | Brennecke et al. |
| 7,521,093 | B2 | 4/2009 | Finerman et al. |
| 2002/0024233 | A1 | 2/2002 | Kleino |
| 2004/0018341 | A1 | 1/2004 | Richardson et al. |
| 2004/0076831 | A1 | 4/2004 | Hable et al. |
| 2005/0121942 | A1 | 6/2005 | Repp et al. |
| 2005/0166532 | A1 | 8/2005 | Barz |
| 2005/0260399 | A1 | 11/2005 | Finerman |
| 2005/0268454 | A1 | 12/2005 | White |
| 2006/0000186 | A1 | 1/2006 | Carlson et al. |
| 2006/0003044 | A1 | 1/2006 | DiNello et al. |
| 2006/0260204 | A1 | 11/2006 | Repp et al. |
| 2007/0045866 | A1 | 3/2007 | Gray et al. |
| 2007/0090560 | A1 | 4/2007 | Kassa et al. |
| 2007/0101679 | A1 | 5/2007 | Harthcock et al. |
| 2007/0257515 | A1 | 11/2007 | Larsen et al. |
| 2007/0281523 | A1 | 12/2007 | Riley |
| 2008/0012263 | A1 | 1/2008 | Dickson et al. |
| 2008/0061602 | A1 | 3/2008 | Czaplicki et al. |
| 2008/0179913 | A1 | 7/2008 | Coon et al. |
| 2008/0226866 | A1 | 9/2008 | Vilcek et al. |
| 2008/0254214 | A1 | 10/2008 | Kassa et al. |
| 2009/0202294 | A1 | 8/2009 | Apfel et al. |
| 2010/0289242 | A1 | 11/2010 | Nitsche et al. |

FOREIGN PATENT DOCUMENTS

| | | |
|---|---|---|
| EP | 1122152 A2 | 8/2001 |
| FR | 2812268 A1 | 2/2002 |
| FR | 2881458 A1 | 8/2006 |
| GB | 1541482 A | 3/1979 |
| GB | 2224683 A | 5/1990 |
| SU | 1803616 A1 | 12/1990 |
| SU | 1803616 A1 | 3/1993 |
| WO | 00/27920 A1 | 5/2000 |
| WO | 2005/077634 A2 | 8/2005 |
| WO | 2005/002950 A2 | 11/2005 |
| WO | 2007/050536 A1 | 5/2007 |

OTHER PUBLICATIONS

International Search Report, Dated Jun. 24, 2008, Application No. PCT/US2008/052004.

Co-pending U.S. Appl. No. 13/185,589, filed Jul. 19, 2011, published as 2009/0202294, dated Aug. 13, 2009.

MECHANICAL METHOD FOR IMPROVING BOND JOINT STRENGTH

CLAIM OF PRIORITY

The present application claims the benefit of the filing dates of U.S. Provisional Application Ser. No. 61/027,294, filed Feb. 8, 2008 and U.S. Provisional Application Ser. No. 61/027,688, filed Feb. 11, 2008, all of which are hereby incorporated by reference for all purposes.

FIELD OF THE INVENTION

The present invention relates to a methods and devices for improving bond joint strength, preventing joint slippage, the protection of two or more joined components from corrosion, or any combination thereof.

BACKGROUND OF THE INVENTION

For many years, industry has developed sealing materials and structural materials that can be located between surfaces of members for limiting exposure of those surfaces to ambient environments and/or for assisting in connecting the surfaces together. Such materials, however, suffer from drawbacks such as slippage during handing or otherwise which may weaken the joint. For example, during the forming of the joint or installation of the structural member, the substrates of typical joints may shift so as to weaken the joint due to slippage therebetween. Since the material used in these prior device comprise the sealing material itself, it is common that at least one of substrates move (e.g., creep) relative to one another along the joint during handling of the joint. Also, it is common that prior sealing devices also undergo deformation causing the sealing material to expel from the joint causing weakened portions of the joint, which may be increased at elevated temperatures. As one example, lap joints have been assembled using fasteners such as rivets and sealants are tested for "slip-load" (e.g., shift force), which is defined as the amount of force it takes to move (e.g., shift or slip) the joint assembly before the mechanical properties of the rivet are realized. "Slip" typically may be caused from an inherent gap (e.g., play) between the hole through the substrate(s) and the slightly undersized rivet pin. Higher slip load values are desired to the increase in structural rigidity of the joint. As another example, expansion/contraction characteristics of the materials during exposure to temperature variances can limit the ability of the materials to seal and/or can degrade materials. As another example, such materials can limit that ability of members to be attached to each other or have a limited ability to enhance the attachment of members to each other. Thus, the present invention provides a sealant material that acts as a seal, a mechanical lock, a structural adhesive material, or any combination thereof or the like wherein the material at least assists in overcoming one of the aforementioned drawbacks or other drawbacks

SUMMARY OF THE INVENTION

The present invention seeks to improve upon prior joint assemblies and particularly reducing the amount of slippage therebetween by providing a method for improving joint strength between a first and second member that includes the steps of providing a first member having a first connection region with an internal and external surface. The sealant material includes a matrix material at least partially encasing rigid components that is applied to the internal surface of the first connection region. A second member having a second connection region with an internal and external surface is positioned such that the first and second connection regions overlap with the sealant material being located therebetween. The first and second members are joined upon an application of force that is applied through the use of one or more fasteners thereby displacing the sealant material to allow direct contact between the rigid components and both internal surfaces of the first and second connection regions so that a depression is formed by plastic deformation in both the first and second connection regions by the rigid components, and a portion of the rigid components remains within the plastically deformed depression. Wherein a compressive force is applied to the exterior surface of both the first and second connection regions by the one or more fasteners while the rigid components apply an internal tension force acting opposite of the compression force to the interior surface of both the first and second connection regions proximate to the fastener to form a mechanical lock thereby reducing slippage and generally maintaining the joint in position.

In another aspect, the present invention contemplates a method for improving joint strength between a first and second member including the steps of providing a first member having a first connection region with an internal and external surface. A sealant material including a matrix material at least partially encasing rigid components is applied to the internal surface of the first connection region. The rigid components are present in an amount between 15% to about 35% by wt the sealant material. A second member having a second connection region with an internal and external surface is positioned such that the first and second connections regions overlap with the sealant material being located therebetween. Openings are formed through the overlap in the first and second connection regions for receiving removable fasteners therethrough. The first and second members are joined upon an application of force that is applied through the use of the removable fasteners thereby displacing the sealant material to allow direct contact between the rigid components and both internal surfaces of the first and second connection regions so that depressions are formed by plastic deformation therein by the rigid components, and a portion of the rigid components remains within the plastically deformed depression to form a mechanical lock thereby reducing slippage and generally maintaining the lap joint in position. The first and second connection regions are sealed by activating the sealant material upon an application of heat. Wherein the removable fasteners are positioned along the lap joint thereby forming a spacing therebetween such that after activation, the lap joint includes a plurality of bondlines, the plurality of bondlines having a first bondline ranging from about 0.05 mm to about 0.15 mm at portions of the first and second connection regions proximate to each removable fastener and a second bondline ranging between 0.3 mm to about 0.8 mm at portions of the first and second connection regions within the spacing.

In another aspect, the present invention contemplates a structural joint including a first member having a main body portion extending from a first connection region having an internal and external surface and a free edge, and a second member including a main body portion extending from a second connection region having an internal and external surface and a free edge. The structural joint further includes a heat activated material that includes a pliable matrix material encased over rigid components, the heat activated material being placed between the internal surfaces of the first and second regions and configured to seal the first and second connection regions of the first and second members from the surrounding environment. Removable fasteners are provided in the joint, which extend through openings formed in the first and second members at portions of the first and second connection regions, the fasteners being positioned along the lap joint by a spacing therebetween. Depressions are formed in the structural joint by plastic deformation of the internal surfaces of the first and second connection regions by the rigid components. Formation of the depression occur during the fastening of the removable fasteners to join the first and second members so that lateral movement of either the first member or the second member relative to one another is resisted to generally maintain the lap joint in position. Upon application of heat, the heat activatable material wets to fill openings and seal the first and second connection regions, thereby forming a plurality of bondlines, the plurality of bondlines having a first bondline ranging from about 0.05 mm to about 0.15 mm at portions of the first and second connection regions proximate to each removable fastener and a second bondline ranging between 0.3 mm to about 0.8 mm at portions of the first and second connection regions within the spacing. The rigid components have a compressive strength that is greater than the respective yield strength of each of the first and second members. It is appreciated that the first connection region overlaps the second connection region such that the main body portions of the first and second member extend in opposite directions and the free edge of the first connection region does not extend beyond the free edge of the second connection region.

In yet another aspect, any of the aspects of the present invention may be further characterized by one or any combination of the following features: activating the sealant material upon the application of heat to seal the connection regions; upon exposure to an elevated temperature, the matrix material expands to a volume that is less than 50% greater than the volume of the matrix material in an unexpanded state; forming an opening through the overlap of the first and second connection regions for receiving one of the one or more fasteners therethrough, wherein the one or more fasteners are removable fasteners; the one or more fasteners include a plurality of fasteners, the plurality of fasteners being positioned along the joint thereby forming a spacing therebetween such that after the activating step, the joint includes a plurality of bondlines, the plurality of bondlines having a first bondline ranging from about 0.05 mm to about 0.15 mm at portions of the first and second connection regions proximate to each fastener and a second bondline ranging between 0.3 mm to about 0.8 mm at portions of the first and second connection regions within the spacing; between about 30% to about 45% of the rigid components remain within each depression at the portions of the first and second connection regions proximate to each fastener and less than about 20% of the rigid components remain within each depression at the portions of the first and second connection regions within the spacing; upon forming the depressions, the internal surface area of the first and second connection regions is increased so that the amount of internal surface available for contact with the matrix material increases at both portions of the connection regions that are proximate to each of the fasteners and within the spacing; between about 50% to about 90% of the resistance to slip is achieved by the contact of the rigid components and the internal surfaces at the portions of the first and second connection regions proximate to each of the fasteners and between about 50% to about 90% of the resistance to slip is achieved by the contact of the matrix material and the internal surfaces at portions of the first and second connection regions within the spacing; the rigid components are configured to generally resist displacement of the first and second members toward one another so that as the force is being applied through the use of the one or more removable fasteners the amount of the sealant material expelled from the joint is controlled; the resulting slip load observed upon pulling in tension the first member from the second member is at least 200% greater than that which would be observed if compared with a resulting slip load of a joint formed by a comparable structure that omits the rigid components and the depressions formed in both the first and second connection regions by the rigid components; the heat activatable material includes at least one tacky surface; the one or more rigid components are present in the amount of about 0.1 to about 50 wt % of the sealant material; the one or more rigid components include an average diameter of about 0.05 mm to about 1.0 mm; the one or more rigid components are formed of glass, metal, ceramic, rubber or any combination thereof; a compressive force is applied to the exterior surface of both the first and second connection regions by the removable fasteners while the rigid components apply an internal tension force acting opposite of the compression force to the interior surface of both the first and second connection regions proximate to each removable fastener to form a mechanical lock thereby reducing slippage and generally maintaining the joint in position; the resulting slip load observed upon pulling in tension the first member from the second member is at least 300% greater than that which would be observed if compared with a resulting slip load of a lap joint formed by a comparable structure that omits the rigid components and the depression formed in at least one of the first and second members by the rigid components; or any combination thereof.

It should be appreciated that the above referenced aspects and examples are non-limiting as others exist with the present invention, as shown and described herein. For example, any of the above mentioned aspects or features of the invention may be combined to form other unique configurations, as described herein, demonstrated in the drawings, or otherwise.

DETAILED DESCRIPTION OF THE INVENTION

Figure 1:
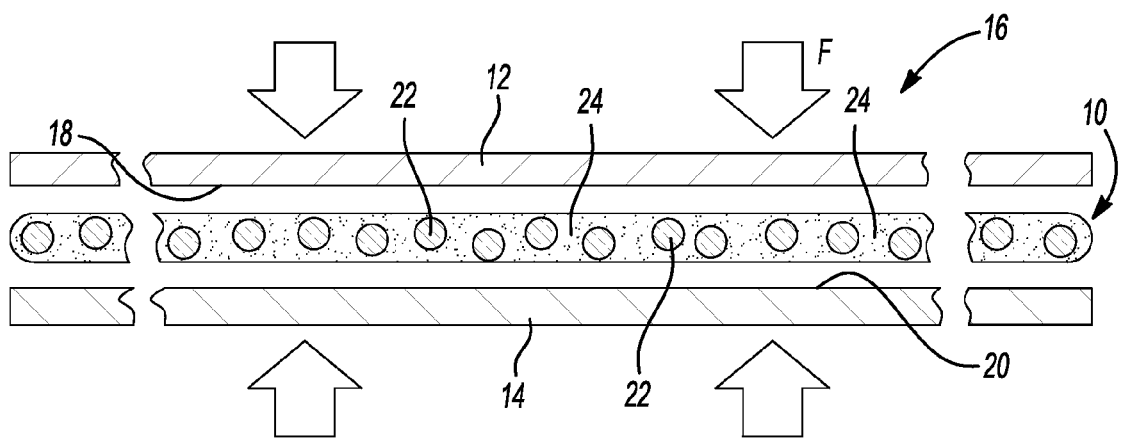
FIG. 1 shows a cross sectional view of the structural joint according to the teachings of the present invention.
Figure 2:
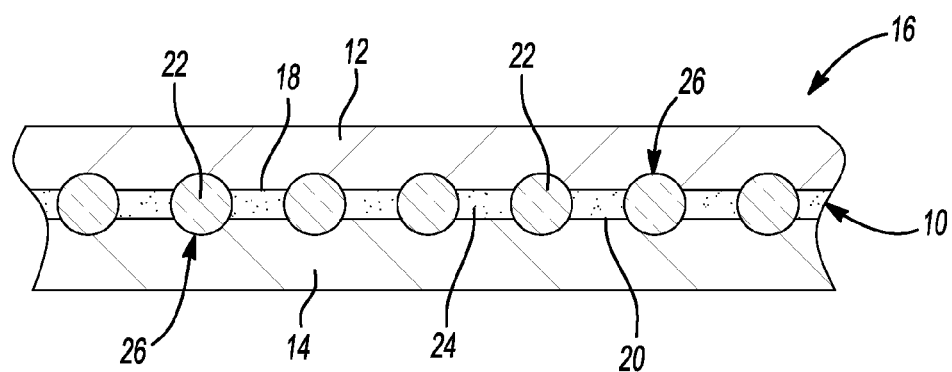
FIG. 2 shows the structural joint shown in FIG. 1 after joining of the two components.

The present invention provides a method for improving bond joint strength of a structural member (e.g., of an automotive vehicle or otherwise). Referring to the drawings, this is achieved through the use of a sealant material (e.g., adhesive material) 10 placed between a first and second member 12, 14, respectively, prior to joining of the same to form the joint assembly 16. The sealant material includes a matrix material having one or more rigid components (e.g., rigid locating feature) for deforming at least one of the first and second members and may be configured to fill open space between the first and second member, surround the rigid components and joining internal portions (internal contacting regions) 18, 20 of the first and second members with the sealant material, or both.

The present invention overcomes these and other problems of the prior art by providing a higher strength material for deforming the first and second members by forming a depression therein that substantially limits or prevents slippage or loosening of the joint (e.g., during handling, installation, use, or otherwise), thermal cycling, or otherwise assists in substantially resisting slippage of the joint and optionally provides a spacer between the first and second members. This is because the higher strength material (e.g., sealant material) includes the rigid components (e.g., beads, or otherwise) which remain partially located within the depressions so that movement of at least one of the members relative to the other may be further restricted to generally maintain the joint in position. The matrix material of the sealant then seals any gaps formed between the internal connection regions thereby substantially limiting or preventing corrosion of the connecting regions of the first and second members. This is because, due to the sealing material sealing the edges of the joint, moisture is substantially limited or prevented from contacting the contacting points of the first and second member, which further prevents electrolytes from initiating corrosion since they originate from moisture.

The substrates (e.g., first and second members) suitable for use in the present invention may be essentially any substrate having a sufficient thickness so as to be capable of being embedded by the rigid components and is preferably a planar surface such as a panel, though not required. The substrate may be a malleable surface such as a metallic surface. The substrate may be formed of one or any combination of various metals including steel, iron, aluminum, brass, copper, and the like. However, the surface may also be formed of one or any combination of various non-metallic materials such as thermoset resins and thermoplastics. Examples of thermoset resins include epoxy resins and polyesters, while examples of thermoplastics include polyureas and polycarbonates. The present method may be utilized to mechanically lock two similar or two dissimilar surfaces. It is preferred to utilize planar aluminum panels in the present invention. Aluminum panels utilized in the formation of the structural lap joint typically have a thickness ranging from about 0.3 mm to about 3.0 mm, preferably from about 0.5 mm to about 1.5 mm.

Generally, the sealant material 10 includes a first component 22 comprising a rigid material configured to resist deformation upon the application of force used to join the members. The sealant material also includes a second component (e.g., matrix material) 24, which preferable encases or otherwise is attached or becomes attached to the first component. The second component is at least partially pliable so as to surround the first component and the contacting points or region of the structural member.

The sealant material having the first and second components may be applied to the carrier using molding or shaping techniques, which may be automatic, semi-automatic, or manual. Such techniques include blow molding, rotation molding, injection molding, compression molding casting, or otherwise. In one highly preferred configuration, the second component is applied to the carrier through an extrusion (e.g. co-extrusion) process.

The thickness of the sealant material may vary depending upon a number of factors such as whether and to what level the second component is activatable or expandable. The thickness may also be dependent upon the volume of open space between the first and second members to be filled, and/or the amount of the first component in the sealant material. Still further, the thickness may be based upon the pliability of the second component. Examples of suitable thicknesses include between about 0.5 to 10 mm or between about 1 to 5 mm or otherwise (e.g., prior to activation of the sealant material).

The sealant material may be generally dry to the touch or tacky and can be placed upon the first or second members in any form of desired pattern, placement, or thickness, but is preferably of substantially uniform thickness. One exemplary material is L-5204 structural foam available through L&L Products, Inc. of Romeo, Mich. In one aspect, the sealer may include at least one tacky surface.

In another aspect, the second component of the sealant material may be configured to be a weld through product. When incorporated as a weld through product, the second component may be configured to provide additional sealant around the weld.

It is contemplated that the sealant material could be delivered and placed into contact with the assembly members, through a variety of delivery systems which include, but are not limited to, a mechanical snap fit assembly, extrusion techniques commonly known in the art as well as a mini-applicator technique as in accordance with the teachings of commonly owned U.S. Pat. No. 5,358,397 ("Apparatus For Extruding Flowable Materials"), hereby expressly incorporated by reference. In this non-limiting embodiment, the sealant material or medium is at least partially coated with an active polymer having damping characteristics or other heat activated polymer, (e.g., a formable hot melt adhesive based polymer or an expandable structural foam, examples of which include olefinic polymers, vinyl polymers, thermoplastic rubber-containing polymers, epoxies, urethanes or the like) wherein the foamable or expandable material can be snap-fit onto the chosen surface or substrate; placed into beads or pellets for placement along the chosen substrate or member by means of extrusion; placed along the substrate through the use of baffle technology; a die-cast application according to teachings that are well known in the art; pumpable application systems which could include the use of a baffle and bladder system; and sprayable applications.

Generally speaking, the sealant material may utilize technology and processes for forming and applying the expandable material such as those set forth in Patent Application No. 20070045866 filed Aug. 1, 2006 and Patent Application No. 20080179913 filed Jan. 4, 2008, which are incorporated herein for all purposes.

First Component—Positive Locating Feature

The seal material includes one or more first components 22 (e.g., rigid component) comprising a flexible or rigid material that is configured to act as a spacer for the first and second members 12, 14. However, preferably, the first component is configured in strength to substantially resist deformation thereof during attachment of the first and second members. Accordingly, the first component may have a compressive strength that is greater than the respective yield strength of each of the two members, so that upon an application of force to bring the two members toward one another, one or more depressions 26 may be formed by the first component in the internal surface of one or both of the connection regions 18, 20 while the first component resist deformation thereof.

The first component 20 may include any mechanically transferring or surface area increasing materials such as, but are not limited to bead-like particles, aggregates, strands, fibers, hollow material (e.g., hollow particle), or otherwise, or any combination thereof. The formation of the depressions (e.g., mechanical deformations) by the first component provides an increase in surface area along each deformed member (e.g., the internal surfaces of the first and second connection regions). In one configuration, the increased surface area provides an increase in the amount of internal surface available for contact with the matrix material and the internal surfaces of the deformed member (e.g., at portion 28 of the connection region proximate to each fastener and at portion 28 of the connection region within the spacing) relative to a similar joint having an internal surface without depressions. In another configuration, a portion of the first component may be generally maintained within the depression(s) of the first and/or second member so that mechanical interlocking of the first component and the first and/or second members may be formed to provide increased resistance (e.g., friction) from slippage of the joint relative to a similar joint having a surface without depressions and a sealant material without the first component.

Suitable materials that may be used to form the first component includes materials such as glass, metal such as steel (e.g., stainless steel, titanium), magnetic material (e.g., magnetic fillers), plastic, ceramic, rubber or otherwise or any combination thereof. In one configuration the first component is formed of polymer. In another preferred configuration, the first component is formed of glass particles due to its high strength for resisting plastic deformation. One exemplary soda lime glass material is Dragonite® Glass Beads available through Jaygo Incorporated of Union, N.J.

In a first exemplary configuration, as shown in FIGS. 1-4 and 7, the first component 10 is formed as particles (e.g., bead-like particles) for deforming at least a portion of the first member, the second member or both. The first components may be formed using any available forming technique (such as extrusion, molding or otherwise). The first components may be geometrical or non-geometrical (i.e. irregular) in shape. The geometry of the first components may vary depending upon the needs of a given application. Available shapes of the particles include circular, triangular, square or rectangular, hexagonal, octagonal, etc, or otherwise.

Also the size of the first components may vary for each application. It is appreciated that the average diameter of the first components may be at least about 0.05 mm, more specifically at least about 0.1 mm. Also, it is appreciated that the average diameter of the first components may be less than about 1.0 mm, more specifically less than about 0.5 mm. For example, the average diameter of the first components may typically range from about 0.05 to about 1.0 mm, more specifically from about 0.1 to about 0.5 mm. It should be appreciated that the shape and size of the first components may vary throughout the sealant material. However, in one preferred configuration the shape and size of the particles are consistent throughout the sealant material.

When the sealant material includes first components, and particularly where that first components is a bead-like particle or otherwise, there may typically be present in an amount of at least about 0.1 wt %, more specifically at least about 5 wt % of the sealant material. Also, it is further appreciated that the first components may be present in an amount less than 50 wt %, more specifically less than 30 wt % of the sealant material. For example, the first components may be present in an amount that ranges from about 0.1 to about 50 wt %, more specifically from about 15 to about 30 wt % of the sealant material.

With respect to the different embodiments contained herein, or otherwise, it is contemplated that all or a portion of the first component may be coated, such as with a sealer or otherwise.

Second Component—Matrix Material

The sealant material also includes a second component 24 comprising a matrix material adapted to seal the connecting regions 18, 20 of the first and second members. The second component may be configured to displace (e.g. elastically, plastically or both) during joining of a first and second member. The second component is provided with the first component during use or application to the first and/or second member. Preferably, the second component is attached or otherwise joined with the first component to improve installation and reduce manufacturing cost.

In one configuration, the second component substantially or entirely encases the first component. The second component may be applied to the first component using common techniques as described herein. However, in one preferred configuration, the first component is added to or otherwise immersed by the second component during the forming (e.g., blending) of the sealant material.

The second component may be formed of any of the material components discussed herein. This includes sealant materials, materials to reduce noise vibration harshness, structural materials or otherwise. However, in a preferred configuration the material is configured to form a seal and prevent moisture (such as corrosive fluids of any kind, including water or otherwise) from entering between the second component and the first or second members.

The second component may comprise a non-activatable material, an activatable material, or a combination of both. For example, the second component may comprise a non-activatable material, such as a typical gasket or otherwise used or capable to seal components and which undergoes little to no physical or chemical change upon application of energy. Alternatively, the second component may comprise an activatable material which does undergo physical and/or chemical change upon application of energy, as described herein. Still further, it is further contemplated that only a portion of the second component may be activatable.

In one preferred configuration, the second component comprises or includes an activatable material to cause sealing. More preferably, the second component comprises a heat activatable material configured to expand upon application of energy (such as heat or otherwise). In another preferred configuration, the second component comprises a non-expandable material and/or a non-activatable material, wherein the second material forms about the contact region of the first and second members and fills open space therebetween.

The second component may be formed of several different materials. Generally speaking, the member may utilize technology and processes for the forming and applying the second component such as those disclosed in U.S. Pat. Nos. 4,922,596, 4,978,562, 5,124,186, and 5,884,960 and commonly owned, co-pending U.S. application Ser. No. 09/502,686 filed Feb. 11, 2000 and Ser. No. 09/524,961 filed Mar. 14, 2000, and U.S. application Ser. No. 10/867,835, filed Jun. 15, 2004, all of which are expressly incorporated by reference for all purposes. Typically, when used for reinforcement, the second component form a high compressive strength and stiffness heat activated reinforcement material (e.g. foam) having foamable characteristics. For example, the compressive strength modulus of the material is preferably greater than about 100 Mpa and more preferably greater than about 800 Mpa and still more preferably greater than about 1500 Mpa.

In one embodiment, it is contemplated that the sealant material may be a heat activated material. Preferably, the sealant material may include a second component having an expandable formulation. The second component may be a resin based material or blends of resin, which may include an epoxy-based material. For example, and without limitation, the second component may be an epoxy-based material (e.g., foam), including an ethylene copolymer or terpolymer that may possess an alpha-olefin. As a copolymer or terpolymer, the polymer is composed of two or three different monomers, i.e., small molecules with high chemical reactivity that are capable of linking up with similar molecules. An example of a preferred structural foam formulation is an epoxy-based material that is commercially available from L&L Products of Romeo, Mich., under the designations L5206, L5207, L5208, and L5209.

The second component may include one or more elastomers. Preferred thermoplastic resins useful in the present invention are polyolefins, preferably copolymers and terpolymers containing ethylene, for example, ethylene vinyl acetate copolymers, ethylene ethyl acrylate, ethylene-maleic anhydride copolymers, ethylene-vinyl acetate-glycidal methacrylate, ethylene acrylate-maleic anhydride, and ethylene-propylene copolymers. Copolymers of ethylene with butene, hexene, or octene are also preferred. Also, certain block copolymers such as a styrene-butadiene block copolymer may be suitable. Preferred thermosetting resins for use in the present invention are epoxies, acrylates, and polyurethanes and combinations thereof. EPDM is particularly preferred. One exemplary second component formulation including an EPDM component is L-2701 that is commercially available by L&L Products.

While the preferred materials for fabricating the second component have been disclosed, the second component can be formed of other materials provided that the material selected is heat-activated or otherwise activated by an ambient condition (e.g. room temperature, moisture, pressure, time, or the like) and cures in a predictable and reliable manner under appropriate conditions for the selected application. One such material is the epoxy based resin disclosed in U.S. Pat. No. 6,131,897, the teachings of which are incorporated herein by reference, filed with the United States Patent and Trademark Office on Mar. 8, 1999 by the assignee of this application. See also, U.S. Pat. Nos. 5,766,719; 5,755,486; 5,575,526; and 5,932,680, (incorporated by reference). In general, the desired characteristics of the second component include relatively high stiffness, high strength, high glass transition temperature (typically greater than 70 degrees Celsius), and adhesion durability properties. In this manner, the material does not generally interfere with the materials systems employed by automobile manufacturers. Exemplary materials include materials sold under product designation L5207 and L5208, which are commercially available from L & L Products, Romeo, Mich.

Preferably, the second component is configured to expand to a volume that is less than about 500%, more typically less than about 250%, even more typically less than about 100% (e.g., between about 0.05% and about 50%) of its original unexpanded volume. It is also contemplated that, when the system of the present invention is used for sealing or baffling, the second component may be designed to absorb or attenuate sound, block off and prevent passage of materials through a cavity or the like. As such, the second component may be configured to expand to a volume that is at least 400%, at least 800%, at least 1600% of even at least 3000% or its original unexpanded volume. Examples of such expandable material are discussed in U.S. Pat. No. 7,199,165, expressly incorporated by reference. In one specific example, it is appreciated that the second component may include a theoretical uncured density ranging from about 1.1 to about 1.9 g/cc (e.g., 1.48 g/cc).

In applications where the second component is a heat activated, thermally expanding material, an important consideration involved with the selection and formulation of the material comprising the structural foam is the temperature at which a material reaction or expansion, and possibly curing, will take place. For instance, in most applications, it is undesirable for the material to be reactive at room temperature or otherwise at the ambient temperature in a production line environment. More typically, the structural foam becomes reactive at higher processing temperatures, such as those encountered in an assembly plant, when the foam is processed along with the automobile components at elevated temperatures or at higher applied energy levels, e.g., during paint curing steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. Similarly, during manufacturing of other transportation device (e.g., bicycle, motorcycles, all terrain vehicles or otherwise), higher temperatures may also be used during paint curing process (such as powder coat applications) or otherwise. In one configuration, the material becomes reactive at temperatures greater than about 120° C., or greater than about 150° C. or even greater than about 160° C. If needed, blowing agent activators can be incorporated into the composition to cause expansion at different temperatures outside the above ranges.

By specific example, it is contemplated that the material may be cured in a powder coat paint cure operation. In such an operation, the material may be exposed to a temperature range between approximately 120°-230° C. with an exposure time between about 10 minutes to 60 minutes. Also, it is contemplated that the material may be cured in a precipitation hardening cure operation. In this operation, the material may be exposed to a temperature range between approximately 150°-230° C. with an exposure time between about 45 minutes to 8 hours.

Some other possible materials for the second component include, but are not limited to, polyolefin materials, copolymers and terpolymers with at least one monomer type an alpha-olefin, phenol/formaldehyde materials, phenoxy materials, and polyurethane. See also, U.S. Pat. Nos. 5,266,133; 5,766,719; 5,755,486; 5,575,526; 5,932,680; and WO 00/27920 (PCT/US 99/24795) (all of which are expressly incorporated by reference). In general, the desired characteristics of the resulting material include relatively low glass transition point, and good adhesion durability properties. In this manner, the material does not generally interfere with the materials systems employed by automotive or other vehicle manufacturers (e.g., motorcycle, bicycle, all terrain vehicles or otherwise). Moreover, it will withstand the processing conditions typically encountered in the manufacture of a vehicle, such as the e-coat priming, cleaning and degreasing and other coating processes, as well as the painting operations encountered in final vehicle assembly.

It is appreciated, that the sealant material may include and expanding formulation may be based on a pressure sensitive formulation, include good green state adhesion, cured adhesion, or any combination thereof to a variety of substrates discussed herein.

Method of Use

Referring to FIGS. 1-3, FIG. 4, and FIGS. 6 and 7, three examples of use of the sealant material of the present invention are shown, respectively. The present invention is particularly suited for fastening (e.g. riveting, bolted, or otherwise) systems for joining and maintaining in position two or more members.

It is appreciated that fastening refers to the use of a fastener (e.g., removable fastener) for joining the first and second members. As defined herein, a removable fastener refers to a fastener that may be a separate component (e.g., non-integral with the first member and/or second member prior to joining or fastening) that becomes attached to the joint (e.g., both the first and second members). Furthermore, it is appreciated that a removable fastener refers to a separate component that may be removed and then re-fastened to the joint or may be removed and rendered non-reusable. Examples of removable fasteners or other mechanical joining methods may include but are not limited to riveting, resistance welding (e.g., spot welding), screw fasteners, molding, or otherwise, or any combination thereof. An example of a non-removable fastener (e.g., an integral component) may be a hem flange. With reference to FIG. 1, the sealant material, as described herein, is placed between a first and second member 12, 14 prior to attachment of the same. The first and second members are then brought together and an application of force 'F' is applied, through the use of one or more fastening devices, or otherwise.

The sealant material may be placed within the joint 16 by the application of the sealant material to at least one of the first and second members. The sealant material may be applied in a continuous manner or a variable manner along a surface. The sealant material may be applied in one or more applications to a surface with consistent or non-consistent spacing therebetween. The sealant material may be preformed and optionally shaped prior to application to a surface. The sealant material may further include openings, projections, depressions, or otherwise, which may be formed during the application of the sealant material to a surface, during the forming of the sealant material perform, during the application of the fastener, or otherwise and may assist in the forming, bonding, and/or fastening of the joint.

As shown in the three examples, gaps may be formed between the first component and the first and second members 12, 14. These gaps may be partially or completely filled by the matrix material (e.g., second component) before activation of the matrix material, after activation of the matrix material or both. For example, during attachment of the first and second member, the generated torque formed during attachment of the first and second members may cause the matrix material located over the first component to displace and partially or completely fill the gaps (e.g., open spaces) prior to activation. Alternatively, or in addition to pre-activation filling of the gaps, during activation of the matrix material the gaps may be additionally filled with an expanding matrix material.

Figure 3:
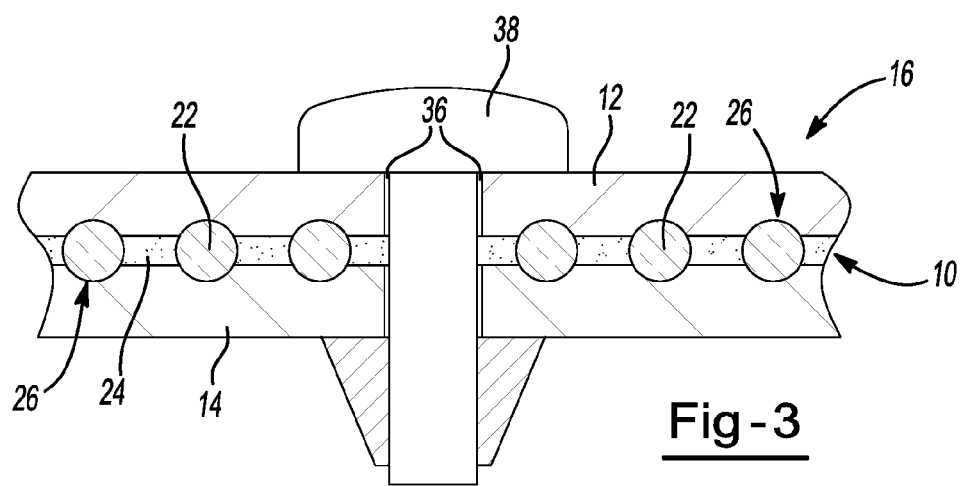
FIG. 3 shows a cross sectional view similar to that shown in FIG. 2, but instead taken through a mounting feature used to join the two members.
Figure 4:
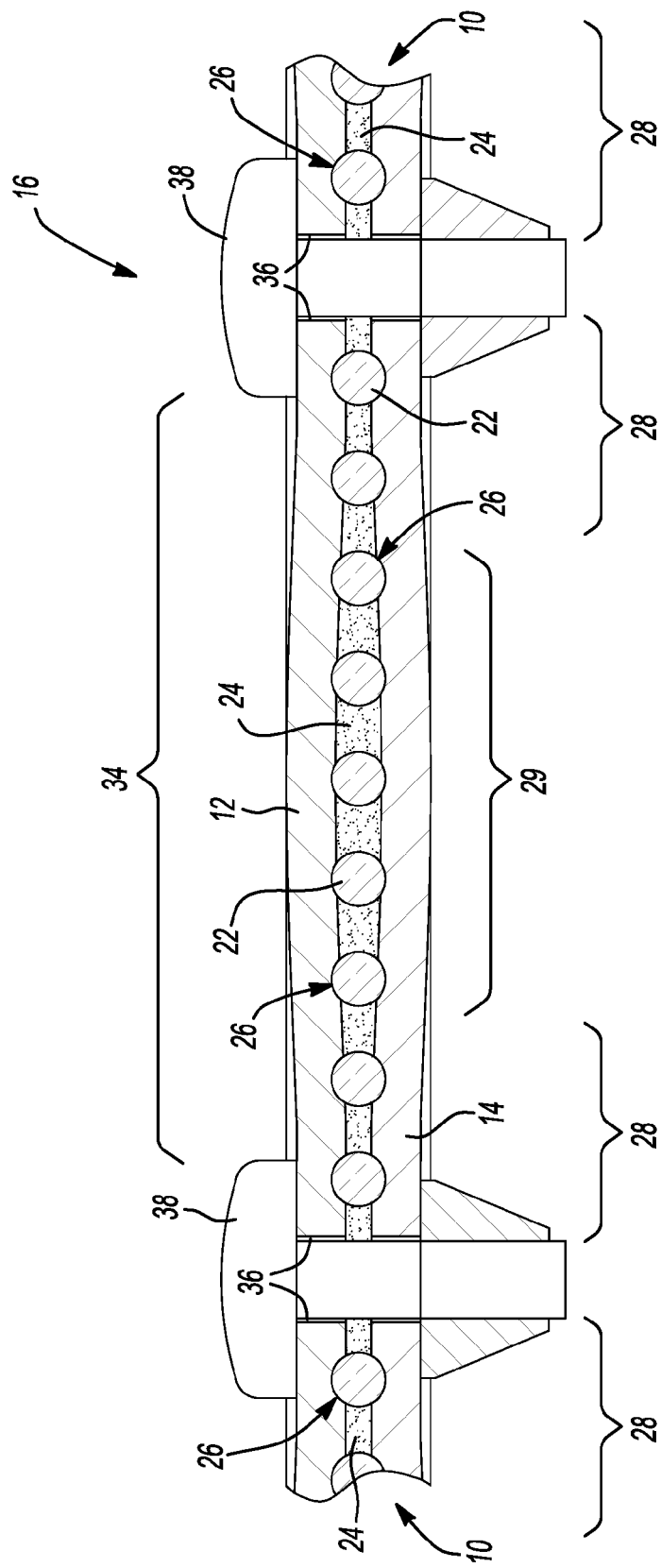
FIG. 4 shows another cross sectional view similar to that shown in FIG. 3, but taken through two mounting features used to join the two members.

Referring to FIGS. 3 and 4, as the force is increased, the matrix material is displaced into the gaps formed in the first and second connection regions and/or through and outside the first and second members through the openings 36. This displacement continues until the first and second member contact the first component, and formation of the depressions 26 occurs. Openings 36 are formed through the sealant material, the joint, or both, the matrix material fills the surrounding area where a fastener 38 extends therethrough to substantially limit or prevent moisture from entering therein.

Joining of the first and second members may be achieved upon an application of force that is applied through the use of fasteners. The compressive force of the fasteners displaces the sealant material so as to allow direct contact between the first components and both internal surfaces of the first and second connection regions. Depressions may be formed by plastic deformation of the internal surfaces of the first and second members (e.g., in the first and second connection regions) by the first components during the fastening (e.g., of the removable fasteners) to join the first and second members. The first components remain at least partially disposed with the plastically deformed depressions to form a mechanical lock thereby reducing slippage, (e.g., so that lateral movement of either the first member or the second member relative to one another may be resisted) and generally maintain the joint in position.

As shown if FIG. 4, the joint assembly 16 may include a plurality of fasteners 38 extending through openings 36 in the connections regions of the first and second members. The fastening by the fasteners provides (and generally maintain) a compressive force to the exterior surface of both the first and second connection regions resulting in compression of the first components. The high compression strength of the first component provides a tension force (to resist the compressive force of the fastener) acting opposite of the compression force to the interior surface of both the first and second connection regions (e.g., proximate to the fastener) to form a mechanical lock thereby reducing slippage and generally maintaining the joint in position. More particularly, the fasteners may apply a compressive force to the external surfaces of both the first and second members for bringing (e.g., joining) them together. The joint may remain in compression by maintaining contact through portions of the fasteners to the respective external surfaces of the first and second members.

The fasteners may be positioned along the joint thereby forming spacings 34 therebetween. At this point the first component acts as a spacer to form and maintain a substantially continuous gap between the first and second members to reduce, control, or substantially prevent "squeeze-out" of the sealant material between the first and second members, through the fastener when included, or otherwise, or any combination thereof. For example, the first components may be configured to generally resist displacement of the first and second members toward one another so that as the force is being applied, (e.g., through the use of the fasteners) the amount of the sealant material expelled from the joint is controlled. As previously mentioned, the first component is suitable in strength so as to provide a reactionary force to the applied force without substantial deformation.

With the first and second members attached, the matrix material may be activated, which in one preferred configuration causes the matrix material to expand and fill any openings formed by the first component. Also, it should be appreciated that the material outside of the first component also expands to form a seal about the entirety of the first component. At this point, the contact regions of the first and second members are entirely sealed from the surrounding environment.

Upon an application of heat, the heat activatable material wets to fill openings and/or gaps and seals the first and second connection regions, thereby forming a plurality of bondlines that may be the same or different depending on the location and the proximity of the fastener. A first bondline may range from about 0.05 mm to about 0.15 mm at portions 28 of the first and second connection regions proximate to each fastener 38. A second bondline may range between 0.3 mm to about 0.8 mm at portions 29 of the first and second connection regions within the spacing 34. As discussed herein, the bondline refers to the distance between the internal surfaces of the first and second connection regions with the activated (e.g., cured) sealant material therebetween. The depth of the depression(s) is not utilized in the measurement of the bondline.

It is appreciated that the compressive force applied by the fasteners may result in reduced bondlines at the portions 28 of the first and second connection regions relative to the portions 29 of the first and second connection regions, which have greater bondlines as the compressive force applied by the fasteners is reduced or not present towards the center of the spacings 34.

A portion of the first components may remain within the depressions in portions of the first and second connection regions (e.g., portion 28 proximate to the fastener), the depressions may be free of a portion of the first components in portions of the first and second connection regions (e.g., within the spacing portions 29), portions of the first and second connection regions may be free of depressions (e.g., within the spacing portions 29), or any combination thereof after the activating of the sealant material. In one configuration, between about 30% to about 45% of the first components remain within each depression at the portions 28 of the first and second connection regions proximate to each fastener 38. However, in another configuration, less than about 20% of the rigid components remain within each depression at the portions 29 of the first and second connection regions within the spacing 34.

In a second configuration, it is contemplated that the sealant material may be formed and/or shaped prior to being applied between the first and second members. For example, the sealant material may be extruded into a sheet and then formed (e.g., die cut) into a desired shape, injected into a mold of the desired shape, or otherwise. As shown is FIG. 6, the sealant material 30 may be formed in a generally circular shape (e.g., washer). The sealant material 30 may include an opening 32, through which a fastener may extend through upon joining of the first and second member. The opening 32 may be formed during the shaping of the sealant material 30 or may be formed after the shaping of the sealant material 30 and prior to application to the joint.

In one configuration, it is appreciated that the sealant material (e.g., the matrix material, the first component or both) may include magnetic materials (e.g., magnetic fillers). The sealant material (e.g., pumpable material, preformed material, or otherwise) may be magnetized for assisting in attachment to one or both of the first and second members.

ONE SPECIFIC EXAMPLE

Figure 5:
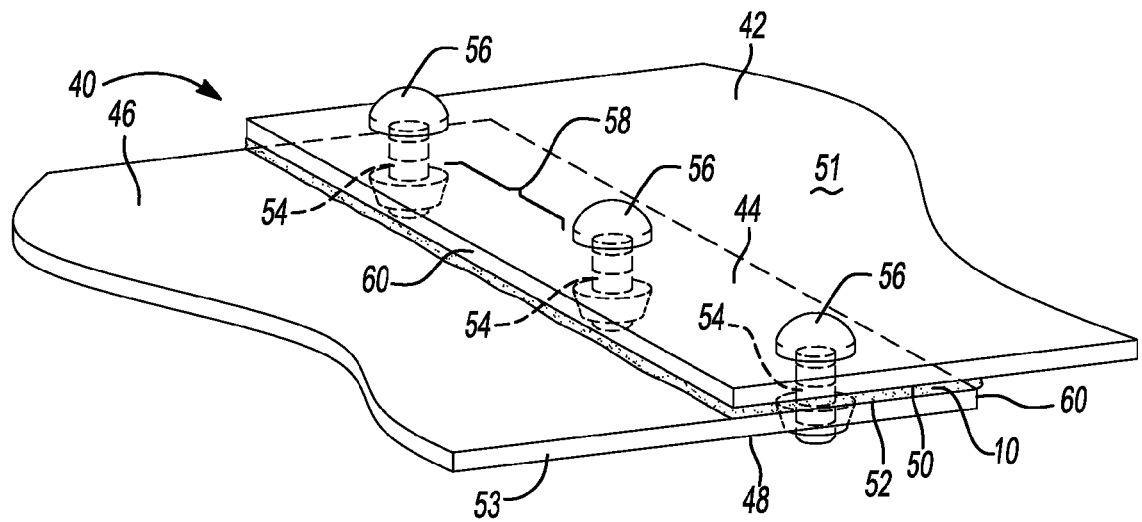
FIG. 5 shows an example of one application of the structural joint according to the teachings of the present invention.
Figure 6:
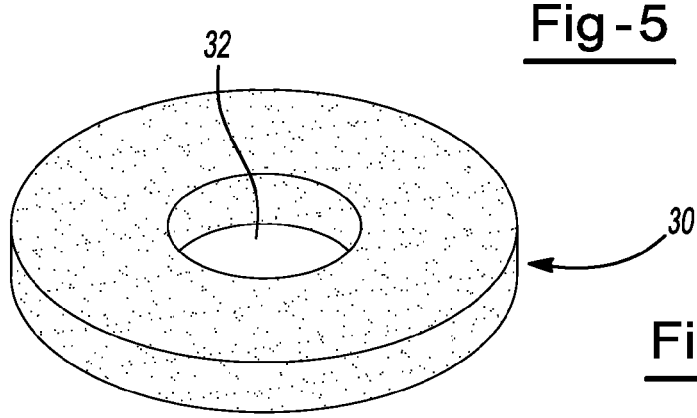
FIG. 6 shows a perspective view of another configuration of the sealant material according to the teachings of the present invention.
Figure 7:
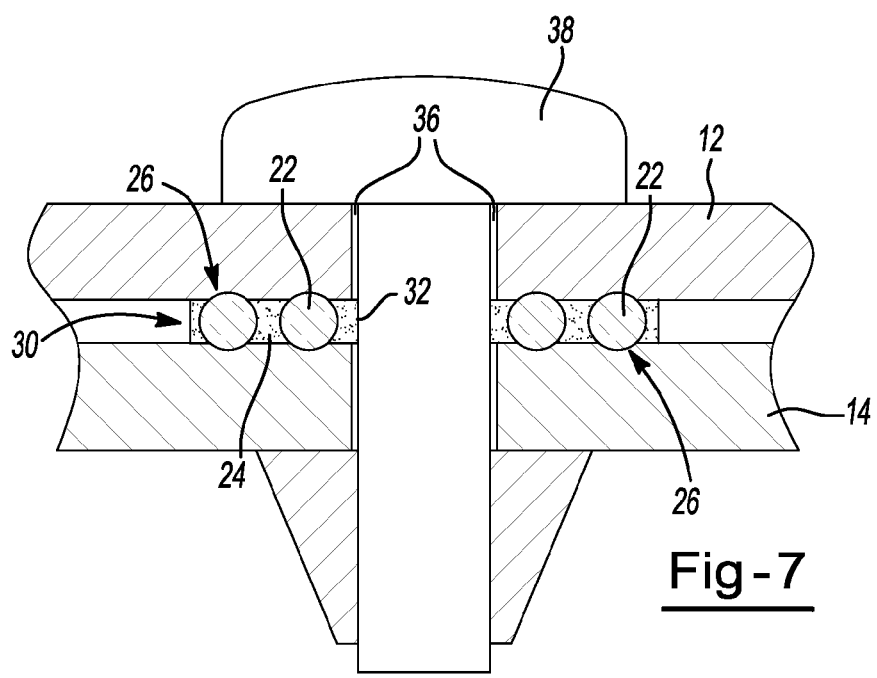
FIG. 7 shows another example of one application of the structural joint using the sealant material shown in FIG. 6 after joining of the two members.

Referring to FIG. 5, one non-limiting example, and use of the structural joint of the present invention is shown. In this example, it should be appreciated that any of the embodiments may be used. In this configuration a lap joint assembly 40 is provided for joining a first wall member to a second wall member of an automotive vehicle. The first wall member includes a first wall main body portion 42, extending from a first wall connection region 44 for attachment to the second wall component. The second wall member includes a second wall main body portion 46, extending from a second wall connection region 48 for attachment to the first wall component. The first and second wall connection regions include a free edge 60 (e.g., generally opposing the respective main body portions). The first and second wall members may include a generally planar internal joining surface 50, 52 and external surfaces 51, 53, respectively. The first and second wall connection regions include openings formed through the overlap of the first and second wall connection regions. The openings extending therethrough for receiving mechanical fasteners 56 (e.g., rivet) may be used for joining the first and second wall members.

It is contemplated that the width of the overlap (e.g., between the free edges of the first and second connection regions) may be at least about 10 mm, and typically at least about 15 mm. Furthermore, the width of the overlap may be less than about 50 mm, and typically less than 30 mm. For example, the length of the overlap may range from about 10 mm to about 50 mm, and typically from about 15 mm to about 30 mm.

The joint further includes a sealant material 10 as described herein. As shown, the sealant material includes a matrix material at least partially encasing the first component such as bead-like particles 60 (e.g., glass beads) therein. The first component configured for forming plastically deformed depressions about the internal joining surface 50, 52, respectively of the first and second wall connection regions to assist in maintaining the first and second wall members in place.

Upon joining (e.g., fastening with the mechanical fasteners) of the first and second members to form the joint (e.g., lap joint), the first and second wall members are generally parallel and opposing members (e.g., sheets) such that the first and second wall connection regions overlap (e.g., at a common free edge) with the sealant material being located therebetween, but do not necessarily include any folds or rap-arounds such as one would find in a hem-flange, and may possibly be free of a hem-flange. The first and second wall members may be positioned such that the first wall main body portion and the second wall main body portion extend in opposite directions and the free edge of the first wall connection region does not extend beyond the free edge of the second wall connection region.

The joint assembly 40 may include fasteners 56 with generally similar spacing 58 therebetween. It is contemplated that a joint having a sealant material with the first component may include greater spacings (e.g., fewer fasteners) relative to a joint having a sealant material without the first component while providing a sufficient joint strength. For example, the spacing between the fasteners 56 may be increased from about 10% to about 40%, and more typically from about 15% to about 30% for a joint having a sealant material with the first component. For example, the spacing between each fastener may increase from about 75 mm to between about 90 mm and about 100 mm).

EXAMPLES

The sealant material including the first component (e.g., beads) may be applied to a joint (with at least one substrate near or around one or more fasteners such as a rivet) to assist in maintaining the substrate(s) in position and optionally sealing the joint from the surroundings such as water, air, or otherwise leakage.

It is believed that the sealant material of the present invention (e.g., with the first component) resulted in increased slip-load forces relative to previous sealant materials (e.g., with or without spacer materials) used in similar joint configurations as determined from lap shear testing. Slip load forces being defined as the amount of force at which a load drops off (e.g., point at which movement occurs by one substrate relative to another while in shear). Typically the substrates may be joined by mechanical means such as fasteners, chemical means such as adhesives, or both. Accordingly, it is appreciated that joints resulting in lower slip loads, provide reduced resistance from movement (e.g., slippage), which weakens joint strength.

The lap shear test includes providing two test coupons of similar dimensions (e.g., each about 25.4×101.6 mm (1"× 4")). Applying a strip of sealant material across the width of the first test coupon, near the end portion thereof. Joining the end portion of second test coupon to the sealant material located on the first test coupon such that the test coupons extend along the same axis and the joined ends of the first and second test coupons overlap one another with the sealant material located therebetween to form an overlap portion. The overlap portion is sufficient to provide failure in the sealant material, and not in the test coupon. Typical overlaps are 12.7 mm and 25.4 mm (0.5" and 1"). The free ends of the first and second test coupons being extended in opposite directions along the same axis. An opening is formed in the overlap portion of the joint through the sealant material and the first and second test coupons for receiving a fastener. A force is applied to the overlap portion through the use of a fastener (e.g., rivet) to further join the first and second test coupons. The fastener is generally centrally located in the overlap portion of the joint.

Each test coupon is pulled in tension (e.g., in opposite directions generally along the same axis) using a laboratory test frame such as an Instron until the load drops off (e.g., until shifting occurs between one test coupon relative to the other). Note, since the hole diameter of the opening of the coupons are larger than the fastener, sliding may occur until one or both of the test coupons collides with the fastener.

The resulting slip load observed from a joint having a sealant material with the first component increased at least about 50% greater, more typically at least about 200% greater, and yet more typically at least about 300% greater (e.g., about 450% greater and with a resulting slip load of about 360 lbs) than a similar joint having a sealant material without the first component. Furthermore, slip load for a joint having a sealant material with the first component may range from about 50% greater to about 1000% than a similar joint having a sealant material without the first component. For example, a joint having a sealant material with the first component may provide a slip load of about 200 lbs, which is about 400% greater than a similar joint having a sealant material without the first component that provides a slip load of about 50 lbs. It is appreciated, that a resulting slip load for a joint having a sealant material with the first component may be at least about 125 lbs, typically at least about 250 lbs, and more typically at least about 350 lbs.

It is appreciated that the resistance to slip by the first and second members may be a combination of the adhesive strength of the matrix material to the internal surfaces of the first and second connection regions and/or the depressions, the interaction of the first component and the depressions, or a combination of both relative to the location along the joint. In one configuration, between about 50% to about 90% of the resistance to slip may be achieved by the direct contact of the rigid components and the internal surfaces at the portions 28 of the first and second connection regions proximate to each of the fasteners. In another configuration, between about 50% to about 90% of the resistance to slip may achieved by the contact of the matrix material and the internal surfaces at portions 29 of the first and second connection regions within the spacing.

In one non limiting example, the resulting slip load observed upon pulling in tension the first member from the second member with the sealant material having the matrix material and the first component (e.g., about 5% to about 10% by wt the first component) therebetween in a cured lap joint of the present invention increased between about 5% and about 20%, and typically between about 10% and about 20% relative to a similar lap joint of the present invention in an uncured state (e.g., green state). For example, the resulting slip load observed that may be sufficient to shift (e.g., move one member relative to another may range from about 235 lbs to about 255 lbs for a lap joint of the present invention including a sealant material (having about 5% to about 10% by wt the first component) in an uncured state. Furthermore, the resulting slip load observed that may be sufficient to shift (e.g., move) one member relative to another may range from about 260 lbs to about 280 lbs for a lap joint of the present invention including a sealant material (having about 5% to about 10% by wt the first component) in a cured state.

The sealant material without the first component results in lower slip loads from reduced frictional properties, mechanical properties, or both, and optionally results in smaller bondlines (e.g., due to squeeze-out of sealant material). It is believed that upon the application of a force (e.g., through contact, under shear, or otherwise), the sealant material without the first component may cause the joint (e.g., the first member, the second member, or both) to move, slip, or both relative to one another, so that the first and second members may fail to remain in position about the joint thereby possibly weakening the joint. It is appreciated that the slip load may be increased in a joint having the sealant material without the first component by utilizing more sealant material. However, this may result in higher material costs, larger bondlines (which may decrease resistance of movement of the one substrate relative to another while in the green-state) or both.

OTHER APPLICATIONS

The reinforcing system of the present invention may be utilized in various aspects of structural reinforcement, particularly in the transportation industry for motorcycles, bicycles, automotive vehicles, boats such as submarines, airplanes, trains, or otherwise, in the power equipment industry such as a tractor, lawn mower, or otherwise, in the building industry such as walls, frames, doors, elevators, or otherwise, in the appliance industry such as refrigerators, oven, sinks, or otherwise or any other industry. It is appreciated that the present invention may be intended for use in materials constructed from materials (e.g., sheet material) such as metals (e.g., aluminum, steel, alloys, or otherwise), plastics such as polyester, composites, wood, or otherwise. In one particularly advantageous application, the reinforcing system of the present invention may be used for applications where metal components are joined together and wherein such components are commonly exposed to shearing, moisture, or both. In these configurations, the joint of the present invention provides solid joining of such components while preventing weakening of joints and/or protecting the same from corrosion. Additional components for which the present invention can be useful include, without limitation semi trucks, semi truck trailers, wagons, airplane wings, or the like.

It should be appreciated that the reinforcing system of the present invention may be used in repair shops, in general assembly plants, or otherwise. Not only does the reinforcing system provide improved attachment for two or more components during original manufacturing, but also provides improved attachment for components which integrity (e.g. strength or otherwise) has be jeopardized, such as during an accident.

The present invention, as has been discussed can provide multiple advantages. As one example, an individual, machine or combination thereof can fasten (e.g., rivet, bolt, screw or otherwise affix) two or more surfaces or members together and limit or prevent movement of the members while optionally preventing corrosion and/or loosening of the joints (e.g., fasteners). The limiting or prevention of joint loosening can be accomplished, in one preferred embodiment, by drawing or forcing together or tightening of the surfaces or members together (e.g., via the fasteners until contact (e.g., metal to metal contact) is achieved while deforming the members or surfaces by the first component. The surfaces or member can continue to be drawn or forced together to produce a compressive force upon the sealant material that does not experience an undesirably high amount of creep (e.g., movement) that can be caused by time passing and/or temperature changes. In this manner, position is maintained on the individual substrates relative to one another thereby inhibiting or preventing joint loosening. The present invention, in turn, can then limit or eliminate checks and re-checks of joint position (e.g., position of the substrates relative to one another) that might otherwise be needed and can limit or eliminate the need for re-tightening of such fasteners, re-positioning of one or both substrates, or both.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The invention claimed is:

1. A method for improving joint strength comprising the steps of:
   providing a first member having a first connection region with an internal surface and an external surface;
   applying a sealant material including a matrix material at least partially encasing rigid components to the internal surface of the first connection region;
   forming a joint by positioning a second member having a second connection region with an internal surface and an external surface such that the first connection region and second connection region overlap with the sealant material being located therebetween;
   joining the first member and second member upon an application of force that is applied through use of one or more fasteners thereby displacing the sealant material to allow direct contact between the rigid components and both internal surfaces of the first connection region and the second connection region so that a depression is formed by plastic deformation in both the first connection region and the second connection region by the rigid components, and a portion of the rigid components remains within the plastically deformed depression;
   wherein a compressive force is applied to the exterior surface of both the first connection region and the second connection region by the one or more fasteners while the rigid components apply an internal tension force acting opposite of the compression force to the interior surface of both the first connection region and the second connection region proximate to the fastener to form a mechanical lock thereby reducing slippage and generally maintaining the joint in position.

2. The method of claim 1, wherein the sealant material is activated upon an application of heat to seal the connection regions.

3. The method of claim 2, wherein the one or more fasteners include a plurality of fasteners, the plurality of fasteners being positioned along the joint thereby forming a spacing therebetween such that after the activating step, the joint includes a plurality of bondlines, the plurality of bondlines having a first bondline ranging from about 0.05 mm to about 0.15 mm at portions of the first and second connection regions proximate to each fastener and a second bondline ranging between 0.3 mm to about 0.8 mm at portions of the first and second connection regions within the spacing.

4. The method of claim 3, wherein between about 30% to about 45% of the rigid components remain within each depression at the portions of the first and second connection regions proximate to each fastener and less than about 20% of the rigid components remain within each depression at the portions of the first and second connection regions within the spacing.

5. The method of claim 2, wherein the rigid components are present in an amount of about 0.1 to about 50 wt % of the sealant material; the rigid components include an average diameter of about 0.05 mm to about 1.0 mm; and the rigid components are formed of glass, metal, ceramic, rubber or any combination thereof.

6. The method of claim 3, wherein upon forming the depressions, an internal surface area of the first connection region and the second connection region is increased so that an amount of the internal surface available for contact with the matrix material increases at both portions of the connection regions that are proximate to each of the fasteners and within the spacing.

7. The method of claim 6, wherein a resistance to slip of between about 50% to about 90% is achieved by the direct contact of the rigid components and the internal surfaces at the portions of the first connection region and the second connection region proximate to each of the fasteners and between about 50% to about 90% of the resistance to slip is achieved by the contact of the matrix material and the internal surfaces at portions of the first connection region and the second connection region within the spacing.

8. The method of claim 1, wherein, upon exposure to an elevated temperature, the matrix material expands to a volume that is less than 50% greater than the volume of the matrix material in an unexpanded state.

9. The method of claim 1, further comprising the step of forming an opening through the overlap of the first connection region and the second connection region for receiving one of the one or more fasteners therethrough, wherein the one or more fasteners are removable fasteners.

10. The method of claim 1, wherein the rigid components are configured to generally resist displacement of the first member and the second member toward one another so that as the compressive force is being applied through the use of the one or more removable fasteners an amount of the sealant material expelled from the joint is controlled.

11. The method of claim 1, wherein a resulting slip load observed upon pulling in tension the first member from the second member is at least 200% greater than that which would be observed if compared with a resulting slip load of a joint formed by a comparable structure that omits the rigid components and the depressions formed in both the first and second connection regions by the rigid components.

12. The method of claim 1, further including a step of forming the sealant material in a generally circular shape and then applying the sealant material to the internal surface of the first connection region.

13. The method of claim 1, wherein the joint has a slip load of at least about 350 lbs.

14. A method for improving joint strength comprising the steps of:
providing a first member having a first connection region with an internal surface and an external surface;
applying a sealant material including a matrix material at least partially encasing rigid components to the internal surface of the first connection region, the rigid components being present in an amount between about 15% to about 35% by wt of the sealant material;
forming a lap joint by positioning a second member having a second connection region with an internal surface and an external surface such that the first connection region and the second connections region overlap with the sealant material being located therebetween;
forming openings through the lap joint that receive removeable fasteners therethrough;
joining the first member and the second member, upon an application of force that is applied, through use of the removable fasteners thereby displacing the sealant material to allow direct contact between the rigid components and the internal surfaces of both the first connection region and the second connection region so that depressions are formed by plastic deformation therein by the rigid components, and a portion of the rigid components remains within the plastically deformed depression to form a mechanical lock thereby reducing slippage and generally maintaining the lap joint in position; and
sealing the first connection region and the second connection region by activating the sealant material upon an application of heat;
wherein the removable fasteners are positioned along the lap joint thereby forming a spacing therebetween such that after activation, the lap joint includes a plurality of bondlines, the plurality of bondlines having a first bondline ranging from about 0.05 mm to about 0.15 mm at portions of the first connection region and the second connection region proximate to each removable fastener and a second bondline ranging between 0.3 mm to about 0.8 mm at portions of the first connection region and the second connection region within the spacing.

15. The method of claim 14, wherein the rigid components are configured to generally resist displacement of the first member and the second member toward one another so that as the force is being applied, through the use of the fasteners, an amount of the sealant material expelled from the joint is controlled;
the rigid components being formed of glass, metal, ceramic, rubber, or any combination thereof; and
include an average diameter of about 0.05 mm to about 1.0 mm.

16. The method of claim 15, wherein, upon exposure to an elevated temperature, the matrix material expands to a volume that is less than 50% greater than the volume of the matrix material in an unexpanded state.

17. The method of claim 14, wherein the application of force is a compressive force, and the compressive force is applied to the exterior surface of both the first connection region and the second connection region by the removable fasteners while the rigid components apply an internal tension force acting opposite of the compression force to the interior surface of both the first connection region and the second connection region proximate to each removable fastener to form a mechanical lock thereby reducing slippage and generally maintaining the lap joint in position.

18. The method of claim 14, wherein between about 30% to about 45% of the rigid components remain within each depression at the portions of the first connection region and the second connection region proximate to each removable fastener and less than about 20% of the rigid components remain within each depression at the portions of the first connection region and the second connection region within the spacing.

19. The method of claim 18, wherein a resistance to slip of between about 50% to about 90% is achieved by the direct contact of the rigid components with the internal surfaces at the portions of the first connection region and the second connection region proximate to each removable fastener and between about 50% to about 90% of the resistance to slip is achieved by the direct contact of the matrix material and the internal surfaces at portions of the first connection region and the second connection region within the spacing.

20. The method of claim 14, further including a step of forming the sealant material in a generally circular shape and then applying the sealant material to the internal surface of the first connection region.

* * * * *